US007340286B2

(12) United States Patent
Korva et al.

(10) Patent No.: US 7,340,286 B2
(45) Date of Patent: Mar. 4, 2008

(54) COVER STRUCTURE FOR A RADIO DEVICE

(75) Inventors: Heikki Korva, Kempele (FI); Ilkka Niemelä, Oulunsalo (FI)

(73) Assignee: LK Products Oy, Kempele (FI)

(*) Notice: Subject to any disclaimer, the term of this patent is extended or adjusted under 35 U.S.C. 154(b) by 62 days.

(21) Appl. No.: 10/568,966

(22) PCT Filed: Sep. 14, 2004

(86) PCT No.: PCT/FI2004/000531

§ 371 (c)(1),
(2), (4) Date: Feb. 14, 2006

(87) PCT Pub. No.: WO2005/034286

PCT Pub. Date: Apr. 14, 2005

(65) Prior Publication Data

US 2006/0208951 A1 Sep. 21, 2006

(30) Foreign Application Priority Data

Oct. 9, 2003 (FI) ................................. 20031478

(51) Int. Cl.
*H04M 1/00* (2006.01)

(52) U.S. Cl. ............................... 455/575.7; 455/575.1; 343/907

(58) Field of Classification Search ............. 455/575.1, 455/575.3, 575.7; 343/907, 911 R
See application file for complete search history.

(56) References Cited

U.S. PATENT DOCUMENTS 4,800,392 A 1/1989 Garay et al.
5,936,583 A 8/1999 Tadahiko et al.
7,054,671 B2 * 5/2006 Kaiponen et al. ........ 455/575.5
2002/0068602 A1 * 6/2002 Kuriyama et al. .......... 455/550

FOREIGN PATENT DOCUMENTS

EP 0 279 050 A1 8/1988
EP 0 447 218 B1 9/1991
EP 1 439 603 A1 7/2004
JP 7-307612 A 11/1995
JP 2001-267833 A 9/2001

* cited by examiner

*Primary Examiner*—Edward F. Urban
*Assistant Examiner*—Christian A. Hannon
(74) *Attorney, Agent, or Firm*—Darby & Darby P.C.

(57) ABSTRACT

The invention relates to a cover structure for a portable radio device, which structure also serves the forming of an antenna for the radio device. The cover of the radio device comprises a conductive planar component (330) and a dielectric planar component (340) fastened together. A certain part of the dielectric component extends under the conductive component. On the lower surface of that component, i.e. on the inner surface of the cover of the radio device and isolated from the conductive component of the cover, there is a conductive element (320), which is dimensioned to function as the feed element of the conductive component of the cover. Then the conductive component of the cover for its part functions as the radiator of the antenna of the radio device. Thus the cover structure of the radio device is utilized with only minor changes to implement such an antenna structure in which the electromagnetically fed radiating element is part of the cover of the radio device. The antenna becomes simple, with stable electric characteristics and using the space of the radio device efficiently.

6 Claims, 3 Drawing Sheets

Fig. 2a
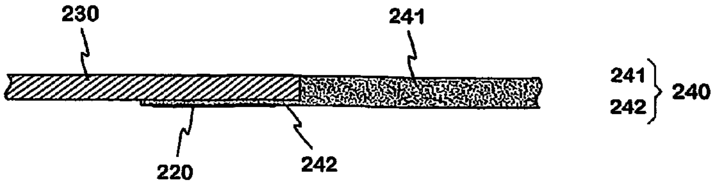
Fig. 2b
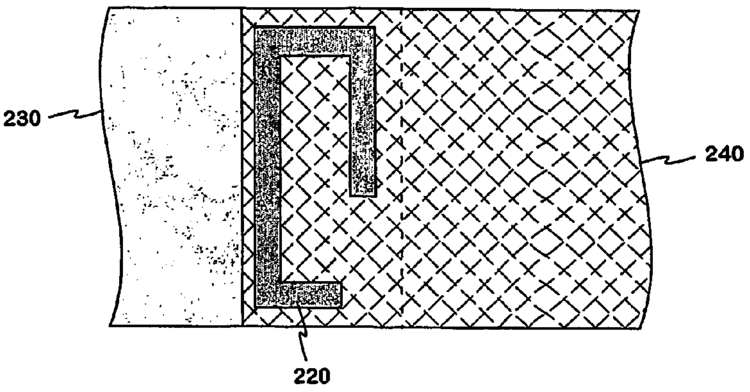
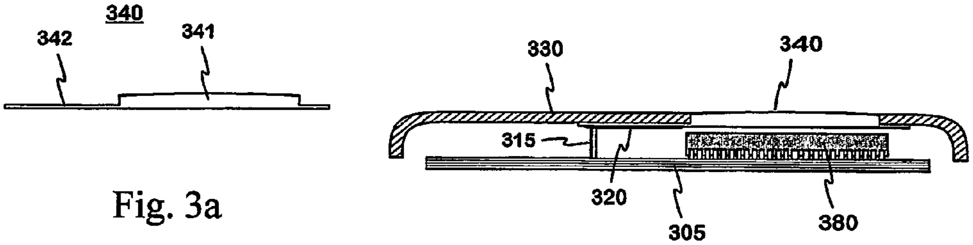
Fig. 3a
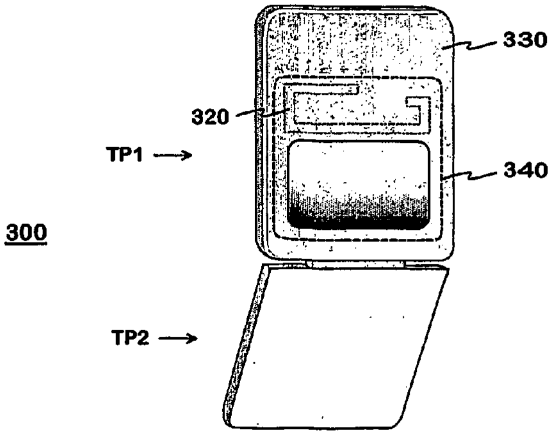
Fig. 3b

COVER STRUCTURE FOR A RADIO DEVICE

CROSS REFERENCE to PRIOR APPLICATION

This is a U.S. national phase application under 35 U.S.C. §371 of International Patent Application No. PCT/FI2004/000531, filed Sep. 14, 2004, and claims benefit of Finnish Patent Application No. 20031478 filed Oct. 9, 2003 which is incorporated by reference herein. The International Application was published in English on Apr. 14, 2005 as WO 2005/034286 A1 under PCT Article 21(2).

The invention relates to a cover structure for a portable radio device, which structure also serves the forming of an antenna for the radio device.

In portable radio devices, especially mobile phones, the demand for ease of use makes a protruding antenna non-desirable, although the electric characteristics of such antennas are better than those of internal antennas. An internal antenna is usually of the planar type, comprising a radiating plane and a ground plane. The characteristics of a planar antenna are obtained the better the greater is its volume. However, when the devices are getting smaller, the space available for the antenna is naturally decreased, which impairs its characteristics. This concerns in particular foldable models having two parts that can be turned on top of each other with a hinge. The turning parts are so flat that the height of the internal antenna, or the distance between the radiating plane and the ground plane becomes too small. Therefore, the antennas of foldable mobile phones are monopole type external antennas in practice.

Figure 1A:
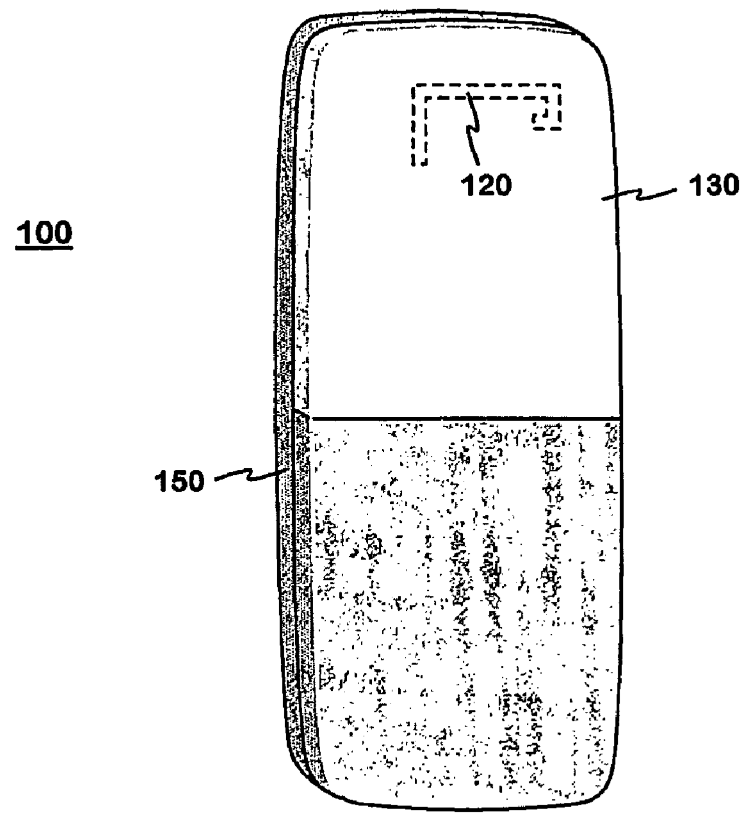
Fig. 1a PRIOR ART
Figure 1B:
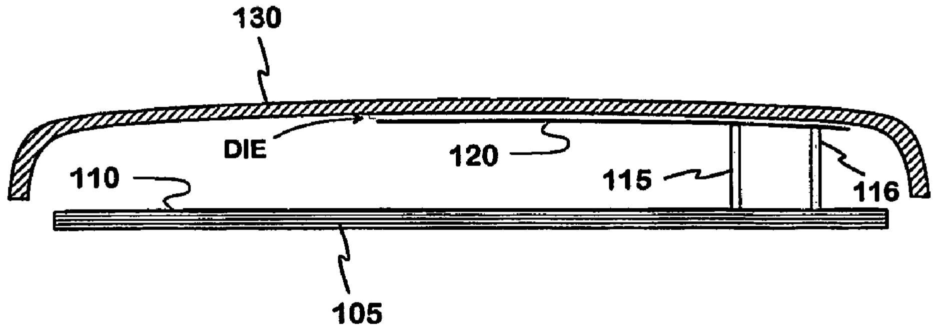
Fig. 1b PRIOR ART

The drawback caused by the lack of space can be reduced by making the radiating element part of the cover of the device. FIG. 1*a* shows such a solution, known as such. There is seen a mobile phone 100 from the back. The upper part 130 of the rear part of the phone cover is made of a conductive material, and it functions as the radiating element of the antenna. Thus the distance of the radiator from the ground plane of the antenna is greater as compared to a corresponding structure comprising an inner, separate radiator. The radiating element 130 is joined without discontinuity to the remaining, dielectric part 150 of the cover. FIG. 1*b* depicts one possibility to feed the radiator according to FIG. 1*a*. FIG. 1*b* shows a cross-section of the mobile phone 100 regarding the antenna structure. There is seen a radiating element 130 and below it the circuit board 105 of the phone, and the ground plane 110 of the antenna on its upper surface. Between the radiator 130 and the ground plane there is a conductive feed element 120, which is galvanically isolated from the radiator by a separate, thin dielectric layer DIE. The radiator has no galvanic coupling to any conductive part of the radio device. Instead, the feed element 120 is galvanically coupled to the antenna port of the radio device with a feed conductor 116 and to the ground plane with a short-circuit conductor 115. FIG. 1*a* shows an example of the shape of the feed element 120. It is a conductor strip, which can have two branches of different lengths as viewed from the short-circuit point for forming two operating bands for the antenna.

Using a separate feed element is advantageous, because then the positions of the operating bands of the antenna and the matching of the antenna can be arranged without changing the shape of the radiator. On the other hand, the electric characteristics of the antenna are sensitive to mechanical changes taking place in the structural part formed by the feeding element and the dielectric layer.

An objective of the invention is to implement an antenna structure in which the radiating element is part of the cover of the radio device, in a new and more advantageous manner. The cover structure according to the invention is characterized in what is set forth in the independent claim 1. Some advantageous embodiments of the invention are set forth in the other claims.

The basic idea of the invention is the following: The cover of the radio device comprises a conductive planar component and a dielectric planar component fastened together. A certain part of the dielectric component extends under the conductive component. On the lower surface of that part, i.e. on the inner surface of the cover of the radio device and isolated from the conductive component of the cover, there is a conductive element, which is dimensioned to function as the feed element for the conductive component of the cover. Then the conductive component of the cover for its part functions as the radiator of the antenna of the radio device.

The invention provides the advantage that the cover structure of the radio device is utilized with only minor changes in order to implement such an antenna structure in which the electromagnetically fed radiating element is part of the cover of the radio device. In this case the antenna becomes simpler and has more stable electric characteristics compared to the prior art. At the same time, the advantages more generally related to the type of structure in question, such as efficient use of space and the possibility to arrange the positions of the operating bands of the antenna and to match the antenna without changing the shape of the radiator, are achieved.

In the following, the invention will be described in more detail. Reference will be made to the accompanying drawings, in which FIG. 1*a* shows an example of a cover structure in which the radiator is part of the cover;

FIG. 1*b* shows an example of a prior art feed arrangement for a radiator according to FIG. 1*a;*

FIGS. 2*a, b* show the principle of a cover structure according to the invention;

FIG. 3*a* shows as a cross-section an example of a radio device with the cover structure according to the invention;

FIG. 3*b* shows the radio device of FIG. 3*a* in its entirety; and

Figure 4:
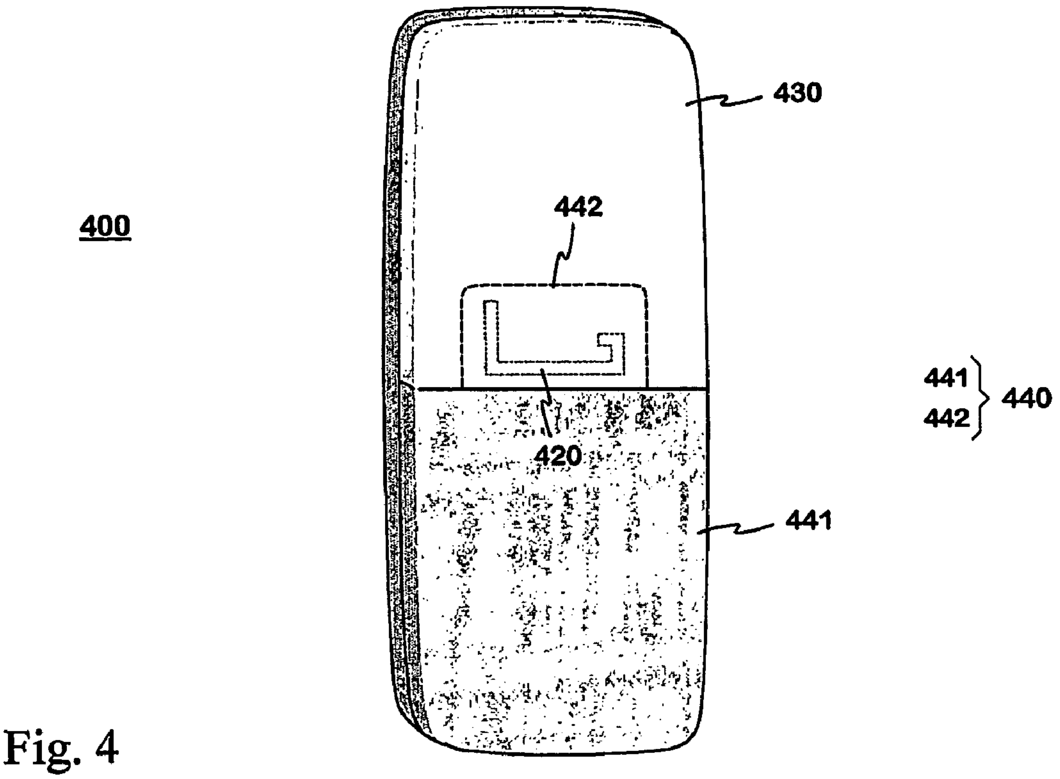

FIG. 4 shows another example of a radio device with the cover structure according to the invention.

FIGS. 1*a* and 1*b* were already described in connection with the description of the prior art.

FIG. 2*a* shows the principle of a cover structure according to the invention as a cross-section. There is seen a conductive planar component 230 and a dielectric planar component 240 as cut close to their joining point. The purpose of the conductive component is to function as a radiator in a radio device with the cover structure in question. The dielectric component is a uniform piece with a first part 241 and a second part 242. The first part is approximately as thick as the conductive component 230 and is arranged in the structure as continuation to the conductive component so that their upper surfaces are substantially on the same level. The second part 242 of the dielectric component is a relatively thin plate-like extension of the first part with its upper surface against the lower surface of the conductive component. The dielectric component is thus joined to the conductive component at least at the end surface of the first part and the upper surface of the second part. The joint is made by gluing, for example, or by fusing the materials together at the junction.

On the lower surface of the second part 242 of the dielectric component there is a conductive element 220, which is fastened to it by gluing, for example, or processed to it using the MID technology (Molded Interconnect Devices). The purpose of the conductive element 220 is to function as a feed element for the conductive component when it functions as a radiator. In order to improve the performance of the antenna, a material with as low losses as possible is selected for the dielectric component.

FIG. 2*b* shows the cover structure according to FIG. 2*a* from below. The inner planar surfaces of the cover are thus visible of the conductive component 230 and the dielectric component 240. In this example, the conductive element 220 is a strip conductor with three rectangular turns so that a figure looking like an open rectangle with a gap is formed.

FIG. 3*a* shows as a cross-section an example of a radio device with the cover structure according to the invention. The image is simplified so that in it only the parts that are substantial with regard to the invention are seen. The cover structure of a radio device includes a conductive component 330 and a dielectric component 340. The latter is also depicted as separate in the small auxiliary drawing. In this example the dielectric component is made of a transparent material. Its first part 341 forms a window for the display of the radio device and the second part 342 is against the lower surface of the conductive component 330. In addition in FIG. 3*a* the circuit board 305 of the radio device and the display component 380 are seen. The display component is on the upper surface of the circuit board 305 at the window of the display. According to the invention, on the lower surface of the second part of the dielectric component there is a conductive element 320. This is coupled to the radio frequency circuits on the circuit board 305 with the feed conductor 315 of the antenna of the radio device. Thus the conductive element 320, together with the conductive component 330 and a ground plane on the circuit board 305 forms a resonator that oscillates on the operating band of the radio device for the transmitting and receiving functions. There can also be more than one operating band, depending on the shape and coupling way of the conductive element 320.

FIG. 3*b* shows an example of the appearance of a complete radio device in FIG. 3*a*. The radio device 300 is a mobile station of foldable model. It has a first turning part TP1 and a second turning part TP2, which are fastened to a hinge between them. The first turning part includes, among other things, the main display of the mobile station and the second turning part includes a keyboard. These are not seen in FIG. 3*b*, because the mobile station is presented from behind. The mobile station 300 is equipped with a second display, which is located on the rear side of the first turning part TP1. The window of the second display is the first part of the above mentioned dielectric component 340 of the cover structure according to the invention. The conductive component 330 of the cover structure extends over the rear part of the first turning part TP1. It has an opening of the size of the window of the second display for that window. The second part 342 of the dielectric component is flange-like and it surrounds the window opening. The second part 342 is shown with a dashed line shaped like a rectangle in FIG. 3*b*. Beside the window of the second display on the inner surface of the cover there is the conductive element 320 also shown with a dashed line.

FIG. 4 shows another example of a radio device with the cover structure according to the invention. The radio device 400 has an elongated shape. About half of the rear part of its cover consists of a conductive component 430 intended as a radiator. The other half of the rear part of the cover is a dielectric component 440, which has a first part 441 and a second part 442 according to the invention. The second part 442 of the dielectric component is located under the conductive component 430 in the same way as the second part 242 of the dielectric component 240 under the conductive component 230 in FIG. 2*a*. In FIG. 4, there is a conductive element 420 intended as the feed element of the radiator on the lower surface of the second part 442.

In this description and the claims, the term "lower" refers to that side of the part of the cover structure of the device which is inner in the complete device. Correspondingly, the term "upper" refers to that side of the part of the cover structure of the device which is outer in the complete device. These terms have thus nothing to do with the position in which the device is used.

A cover structure of a radio device according to the invention has been described above. The location of the substantial structural parts in the cover and the shapes thereof can naturally differ from those presented. The invention does not restrict the manufacturing method of the structural parts or the fastening way; e.g. the conductive component can be manufactured by extrusion or by some other method. The inventive idea can be applied in different ways within the scope defined by the independent claim 1.

The invention claimed is:

1. An outer cover structure for a radio device, comprising a conductive planar component (230; 330; 430) and a dielectric planar component (240; 340; 440), the conductive planar component extending outside the dielectric planar component, which radio device has a planar antenna, a radiating element of which said conductive planar component is, wherein:

the dielectric component comprises a first part (241; 341; 441) and a second part, which are integrally joined to each other, an upper surface of the first part being a part of an upper surface of the outer cover structure, and the second part (242; 342; 442), being located under the conductive component against its lower surface, and on lower surface of the second part of the dielectric component there is a conductive element (220; 320; 420), when connected to the radio device, together with the conductive component of the cover and the ground plane of the planar antenna, forms a resonator that oscillates on at least one operating band of the radio device.

2. A cover structure for a radio device according to claim 1, the radio device having a main display and a second display, characterized in that the first part of the dielectric component (340) is a window of the second display.

3. A cover structure for a radio device according to claim 2, which radio device (300) is of the foldable type having a first (TP1) and a second (TP2) turning part, characterized in that said conductive component (330) extends over a rear part of the first turning part and has an opening of the size of the window for the second display for that window, and the second part of the dielectric component (340) surrounds the opening.

4. A cover structure for a radio device according to claim 1, characterized in that said conductive component (430) is part of a rear part of the cover of a radio device and the dielectric component (440) forms the rest of the rear part of the cover of the radio device.

5. A cover structure according to claim 1, characterized in that there is adhesive material at the junction between the conductive component and the dielectric component.

6. A cover structure according to claim 1, characterized in that the materials of the conductive component and the dielectric component are mixed together at their junction.

* * * * *